(12) United States Patent
Mori et al.

(10) Patent No.: US 8,592,542 B2
(45) Date of Patent: Nov. 26, 2013

(54) POROUS RESIN BEADS AND METHOD OF PRODUCING NUCLEIC ACID USING THE SAME

(75) Inventors: Kenjiro Mori, Ibaraki (JP); Eri Maeta, Ibaraki (JP); Tatsuya Konishi, Ibaraki (JP)

(73) Assignee: Nitto Denko Corporation, Ibaraki (JP)

(*) Notice: Subject to any disclaimer, the term of this patent is extended or adjusted under 35 U.S.C. 154(b) by 293 days.

(21) Appl. No.: 12/490,444

(22) Filed: Jun. 24, 2009

(65) Prior Publication Data

US 2009/0326210 A1 Dec. 31, 2009

(30) Foreign Application Priority Data

Jun. 25, 2008 (JP) ................................. 2008-165379

(51) Int. Cl.
*C08L 9/06* (2006.01)
*C08L 29/08* (2006.01)
*C07H 21/00* (2006.01)

(52) U.S. Cl.
USPC ... 526/329.2; 536/22.1; 536/25.3; 525/329.4; 525/333.3; 525/332.2

(58) Field of Classification Search
USPC .......... 526/329.2; 536/22.1, 25.3; 525/329.4, 525/333.3, 332.2
See application file for complete search history.

(56) References Cited

U.S. PATENT DOCUMENTS

| 4,458,066 | A | 7/1984 | Caruthers et al. |
| 2003/0049418 | A1 | 3/2003 | Sadasivan et al. |
| 2005/0054742 | A1* | 3/2005 | Mori et al. ...................... 521/65 |
| 2005/0256285 | A1 | 11/2005 | Mori et al. |

FOREIGN PATENT DOCUMENTS

| EP | 0 375 278 A2 | 6/1990 |
| EP | 0 534 016 A1 | 3/1993 |
| EP | 1 595 895 A1 | 11/2005 |
| JP | 51-128390 A | 11/1976 |
| JP | 3-68593 A | 3/1991 |
| JP | 04-006463 A | 1/1992 |
| JP | 07-330944 A | 12/1995 |
| JP | 2002-520436 A | 7/2002 |
| JP | 2002-540231 A | 11/2002 |
| JP | 2005-325272 A | 11/2005 |
| JP | 2008-074979 A | 4/2008 |
| WO | WO 92/02535 A1 | 2/1992 |
| WO | WO 00/02953 A1 | 1/2000 |
| WO | WO 00/56790 A1 | 9/2000 |
| WO | WO 03/091267 | 11/2003 |

OTHER PUBLICATIONS de Santa Maria et al., "Synthesis of Crosslinked Resin Based on Methacrylamide, Styrene and Divinylbenzene Obtained from Polymerization in Aqueous Solution", 2003, European Polymer Journal, 39:291-296.*
Lewandowski et al., "Preparation of Macroporous, Monodisperse, Functionalized Styrene-Divinylbenzene Copolymer Beads: Effect of the Nature of the Monomers and Total Porogen Volume on the Porous Properties", 1998, Journal of Applied Polymer Science, 67:597-607.*
*Current Protocols in Nucleic Acid Chemistry*, 3.6.1-3.6.5 (2000).
Japanese Patent Office, Notice of Reasons for Refusal in Japanese Patent Application No. 2008-165379 (May 15, 2012) English translation.
Chinese Patent Office, First Office Action in Chinese Patent Application No. 200910150876.3 (Jun. 25, 2012).

* cited by examiner

*Primary Examiner* — Christopher M Babic
*Assistant Examiner* — Jeremy C Flinders
(74) *Attorney, Agent, or Firm* — Leydig, Voit & Mayer, Ltd.

(57) ABSTRACT

The present invention provides porous resin beads containing an aromatic monovinyl compound-divinyl compound-(meth)acrylamide derivative copolymer. Preferably, the copolymer further contains as a structural unit a second aromatic monovinyl compound having a functional group capable of binding to a carboxyl group by a dehydrating condensation reaction.

18 Claims, No Drawings

POROUS RESIN BEADS AND METHOD OF PRODUCING NUCLEIC ACID USING THE SAME

CROSS-REFERENCE TO RELATED APPLICATIONS

This application is based on a patent application No. 2008-165379 filed in Japan (filing date: Jun. 25, 2008), the contents of which are incorporated in full herein by this reference.

TECHNICAL FIELD

The present invention relates to porous resin beads comprising an aromatic monovinyl compound-divinyl compound-(meth)acrylamide derivative copolymer and a method of producing nucleic acid using the same.

BACKGROUND ART

A solid phase synthesis process based on the phosphoramidite method is widely used to chemically synthesize nucleic acids such as DNA and RNA. In this process, supports for solid phase synthesis supporting a nucleoside that will become the 3' end of a nucleic acid to be synthesized, previously linked via a cleavable linker (e.g., succinyl group and the like), are filled in a reaction column and applied to an automated nucleic acid synthesizer. Subsequently, according to a synthesis program, (1) deprotection of 5'-OH groups of the nucleoside; (2) coupling of nucleoside phosphoramidite to the 5'-OH group; (3) capping of unreacted 5'-OH groups; and (4) oxidization of the resulting phosphite are repeated in synthesis cycles, whereby a nucleic acid having a desired sequence is synthesized. The nucleic acid synthesized is finally cut out from the carrier for solid phase synthesis by hydrolyzing the cleavable linker with ammonia and the like (e.g., non-patent document 1).

Conventionally, inorganic particles of CPG (Controlled Pore Glass), silica gel and the like have been widely used as supports for solid phase synthesis of nucleic acids. As alternatives therefor, highly crosslinked, non-swellable porous polystyrene particles of improved chemical stability (e.g., patent document 1) and low-crosslinked, swellable porous polystyrene particles that enable the mass synthesis of nucleic acids in the production of nucleic acid pharmaceuticals (e.g., patent document 2) have been developed.

Meanwhile, compared with the synthesis of DNA, the synthesis of RNA encounters a problem of decreased amidite coupling efficiency because of the necessity of the use of a phosphoramidite with a protecting group bound to the 2'-OH group thereof, which results in reduced purity of the RNA obtained. To synthesize RNA while minimizing purity reduction, it is necessary to reduce the amount of nucleoside-linker bound, the nucleoside serving as the starting point of the synthesis on the support for solid phase synthesis, which, however, in turn results in a new problem of a reduced amount synthesized per unit amount of support for solid phase synthesis.

SUMMARY OF THE INVENTION

Technical Problem

It is an object of the present invention to provide porous resin beads that are useful as a support for solid phase synthesis enabling the avoidance of a reduction in the amount synthesized and a reduction in synthesis purity not only in the synthesis of DNA, but also in the synthesis of RNA, which is difficult to synthesize chemically as described above.

Solution to Problem

The present inventors extensively studied to solve the above-mentioned problem, and found that when chemical synthesis of RNA is performed using, as a support for solid phase synthesis, porous resin beads consisting of a specified aromatic monovinyl compound-divinyl compound-(meth)acrylamide derivative copolymer, highly pure RNA can be chemically synthesized without a reduction in the amount synthesized. The inventors conducted further investigations based on this finding, and have developed the present invention.

Accordingly, the present invention relates to [1] to [8] below:

[1] Porous resin beads comprising a first aromatic monovinyl compound-divinyl compound-(meth)acrylamide derivative copolymer.
[2] The porous resin beads according to [1] above, wherein the copolymer further comprises as a structural unit a second aromatic monovinyl compound having a functional group capable of binding to a carboxyl group by a dehydrating condensation reaction.
[3] The porous resin beads according to [1] above, wherein the content of the (meth)acrylamide derivative unit in the copolymer is 0.3 to 4 mmol/g.
[4] The porous resin beads according to [2] above, wherein the functional group being present in the second aromatic monovinyl compound is an amino group or a hydroxyl group.
[5] The porous resin beads according to [4] above, wherein the content of the amino group or hydroxyl group in the copolymer is 0.05 to 1 mmol/g.
[6] The porous resin beads according to [1] above, wherein the (meth)acrylamide derivative is selected from the group consisting of N-alkyl(meth)acrylamide, N,N-dialkyl(meth)acrylamide, N-alkoxy(meth)acrylamide, 2-(meth)acrylamidealkanesulfonic acid, N-alkylol(meth)acrylamide, acrylamide, methacrylamide, diacetoneacrylamide, N,N-dimethylaminopropylacrylamide, and acroylmorpholine.
[7] The porous resin beads according to [1] above, wherein the divinyl compound is divinylbenzene.
[8] A method of producing nucleic acid, comprising binding a nucleotide to a nucleoside, nucleotide or polynucleotide, each of which is bound to, via a cleavable linker, any one of the porous resin beads according to [1] to [7] above, to obtain an elongated polynucleotide.

Advantageous Effect of the Invention

The present invention provides porous resin beads that enable the synthesis of a large amount of nucleic acid, without reducing the synthesis purity thereof, when used as a support for solid phase synthesis in nucleic acid synthesis. Use of the porous resin beads of the present invention enables the avoidance of a reduction in the amount synthesized and a reduction in synthesis purity, even for nucleic acids that are difficult to synthesize chemically, like RNA.

DESCRIPTION OF EMBODIMENTS

The present invention provides porous resin beads comprising an aromatic monovinyl compound-divinyl compound-(meth)acrylamide derivative copolymer. As used herein, the term "aromatic monovinyl compound-divinyl compound-(meth)acrylamide derivative copolymer" refers to a copolymer comprising as structural units thereof an aromatic monovinyl compound, a divinyl compound, and a (meth)acrylamide derivative. This copolymer can be prepared by copolymerizing an aromatic monovinyl compound monomer, a divinyl compound monomer and a (meth)acrylamide derivative monomer.

The content of aromatic monovinyl compound-divinyl compound-(meth)acrylamide derivative copolymer in the porous resin beads of the present invention is generally 80% by weight or more, preferably 90% by weight or more, more preferably 95% by weight or more, and most preferably substantially 100% by weight. In the most preferred embodiment, the porous resin beads of the present invention consist of an aromatic monovinyl compound-divinyl compound-(meth)acrylamide derivative copolymer.

"For a copolymer to comprise as a structural unit thereof a compound X" means that the copolymer comprises a structural unit derived from the monomer of the compound X.

The choice of first aromatic monovinyl compound for use in the porous resin beads of the present invention is not particularly limited; examples include styrene; nuclear alkyl-substituted styrenes such as o-methylstyrene, m-methylstyrene, p-methylstyrene, 2,4-dimethylstyrene, ethylstyrene, trimethylstyrene, and p-t-butylstyrene; α-alkyl-substituted styrenes such as α-methylstyrene and α-methyl-p-methylstyrene; nuclear halogenated styrenes such as chlorostyrene, dichlorostyrene, fluorostyrene, pentafluorostyrene and bromostyrene; halogenated alkylstyrenes such as chloromethylstyrene and fluoromethylstyrene; hydroxystyrene; hydroxymethylstyrene; vinyl benzoate; sodium styrenesulfonate; cyanostyrene; methoxystyrene; ethoxystyrene; butoxystyrene; nitrostyrene; acyloxystyrenes such as acetoxystyrene and benzoxystyrene, and the like. The first aromatic monovinyl compound is preferably styrene.

Here, the first aromatic monovinyl compound is distinguished from the second aromatic monovinyl compound described below in that the first does not have a functional group capable of binding to a carboxyl group by a dehydrating condensation reaction.

A typical structural unit from a first aromatic monovinyl compound monomer is the following structural unit (A).

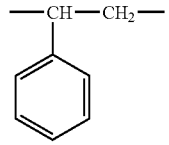

(A)

In the copolymer constituting the porous resin beads of the present invention, the content of a structural unit from a first aromatic monovinyl compound monomer is not particularly limited, and the content is preferably 1 to 9.5 mmol/g, more preferably 2 to 9 mmol/g, and still more preferably 3 to 8 mmol/g.

The choice of divinyl compound for use in the porous resin beads of the present invention is not particularly limited; examples include aromatic divinyl compounds such as divinylbenzene, methyldivinylbenzene, divinyltoluene and divinylnaphthalene; monovalent and polyvalent ethylene glycol di(meth)acrylates such as ethylene glycol di(meth)acrylate, diethylene glycol di(meth)acrylate, triethylene glycol di(meth)acrylate and tetraethylene glycol di(meth)acrylate; monovalent and polyvalent propylene glycol di(meth)acrylates such as propylene glycol di(meth)acrylate and dipropyleneethylene glycol di(meth)acrylate; di(meth)acrylate compounds such as 1,2-butanediol di(meth)acrylate, 1,3-butanediol di(meth)acrylate, 1,4-butanediol di(meth)acrylate, 1,5-pentanediol di(meth)acrylate, 1,6-hexanediol di(meth)acrylate, 1,9-nonanediol di(meth)acrylate, 1,10-decanediol di(meth)acrylate, 2-methyl-1,8-octanediol(meth)acrylate and 1,4-cyclohexanediol dimethacrylate, and the like. The divinyl compound is preferably a divinylbenzene.

Divinylbenzenes include o-, m- and p-divinylbenzenes and mixtures thereof.

A typical structural unit from a divinyl compound monomer is the following structural unit (C).

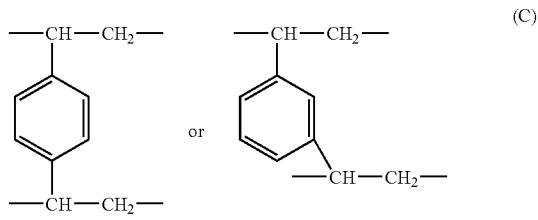

(C)

In the copolymer constituting the porous resin beads of the present invention, the content (mmol) of a structural unit from a divinyl compound monomer is not particularly limited, and the content is generally 0.1 to 2 mmol/g, preferably 0.2 to 1 mmol/g, and more preferably 0.3 to 0.8 mmol/g. If the divinyl compound content is too low, the porous resin beads will not have sufficient solvent resistance, heat stability, or porosity, which in turn sometimes leads to difficulty in obtaining the desired effect in solid phase synthesis of nucleic acid. If the divinyl compound content is too high, the swellability thereof in an organic solvent will decrease, which in turn sometimes leads to a reduction in the amount of nucleic acid synthesized by solid phase synthesis and a reduction in the synthesis purity thereof.

The choice of (meth)acrylamide derivative for use in the porous resin beads of the present invention is not particularly limited; examples include N-alkyl(meth)acrylamides; N,N-dialkyl(meth)acrylamides; N-alkoxyalkyl(meth)acrylamides; 2-(meth)acrylamidealkanesulfonic acids; N-alkylol (meth)acrylamide such as N-methylol(meth)acrylamide; acrylamide; methacrylamide; diacetoneacrylamide; N,N-dimethylaminopropylacrylamide; acroylmorpholine; N-phenoxymethyl(meth)acrylamide and the like.

The alkyl contained in an N-alkyl(meth)acrylamide is a linear or branched alkyl generally having 1 to 6 carbon atoms, preferably 1 to 3 carbon atoms. Examples of N-alkyl(meth)acrylamides include N-methyl(meth)acrylamide, N-ethyl(meth)acrylamide, N-n-propyl(meth)acrylamide, N-isopropyl(meth)acrylamide, N-tert-butyl(meth)acrylamide and N-lauryl(meth)acrylamide.

Each of the two alkyls contained in an N,N-dialkyl(meth) acrylamide is a linear or branched alkyl generally having 1 to 6 carbon atoms, preferably 1 to 3 carbon atoms. Examples of N,N-dialkyl(meth)acrylamides include N,N-dimethyl(meth) acrylamide, N,N-diethyl(meth)acrylamide, N,N-diisopropyl (meth)acrylamide, N,N-di-tert-butyl(meth)acrylamide, N,N-dilauryl(meth)acrylamide, N,N-di-tert-octyl(meth) acrylamide, N,N-dilauryl(meth)acrylamide and N,N-dicyclohexyl(meth)acrylamide.

The alkoxy contained in an N-alkoxyalkyl(meth)acrylamide is a linear or branched alkoxy generally having 1 to 6 carbon atoms, preferably 1 to 3 carbon atoms. The alkyl contained in an N-alkoxyalkyl(meth)acrylamide is a linear or branched alkyl generally having 1 to 6 carbon atoms, preferably 1 to 3 carbon atoms. Examples of N-alkoxyalkyl(meth)acrylamides include N-methoxymethyl(meth)acrylamide, N-ethoxymethyl(meth)acrylamide, N-propoxymethyl(meth)acrylamide, N-butoxymethyl(meth)acrylamide, N-ethoxyethyl(meth)acrylamide, N-methoxypropyl(meth)acrylamide, N-ethoxypropyl(meth)acrylamide and N-isopropoxyethyl(meth)acrylamide.

The alkane contained in a 2-(meth)acrylamidealkanesulfonic acid is a linear or branched alkane generally having 1 to 6 carbon atoms, preferably 1 to 3 carbon atoms. Examples of 2-(meth)acrylamidealkanesulfonic acids include 2-acrylamidepropanesulfonic acid, 2-acrylamide-n-butanesulfonic acid, 2-acrylamide-n-hexanesulfonic acid and 2-acrylamide-2-methylpropanesulfonic acid.

The (meth)acrylamide derivative is preferably diacetoneacrylamide, N-isopropyl(meth)acrylamide, N-methoxymethyl(meth)acrylamide or N,N-dimethyl(meth)acrylamide.

A typical structural unit from a (meth)acrylamide derivative monomer is the following structural unit.

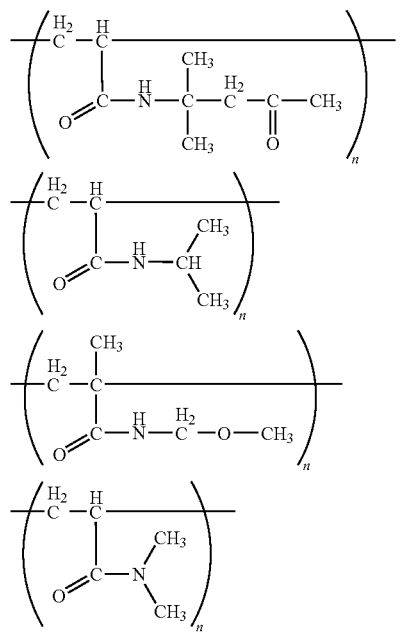

Use of a (meth)acrylamide derivative in the porous resin beads of the present invention enables the avoidance of a reduction in the amount of nucleic acid synthesized and a reduction in the synthesis purity when the nucleic acid is synthesized using the porous resin beads as a solid phase support.

In the copolymer constituting the porous resin beads of the present invention, the content of a structural unit from a (meth)acrylamide derivative monomer is generally 0.3 to 4 mmol/g, preferably 0.4 to 3.5 mmol/g, and more preferably 0.6 to 3 mmol/g. If the (meth)acrylamide derivative content is too low, the desired effect of avoiding a reduction in the amount of nucleic acid synthesized and a reduction in synthesis purity is not obtained; if the (meth)acrylamide derivative content is too high, porous resin beads are difficult to be formed.

In a preferred embodiment, the copolymer in the porous resin beads according to the present invention further comprises as a structural unit thereof a second aromatic monovinyl compound having a functional group capable of binding to a carboxyl group by a dehydrating condensation reaction, in addition to a first aromatic monovinyl compound. Use of such a functional group is advantageous in joining a nucleoside and porous resin beads because it can bind easily to the carboxyl group when the linker used for nucleic acid synthesis has a carboxyl group. Examples of such functional groups include, but are not limited to, amino groups and hydroxyl groups.

Examples of the second aromatic monovinyl compound include, but are not limited to, a compound resulting from substitution of one or more hydrogen atoms of the first aromatic monovinyl compound by a functional group capable of binding to a carboxyl group by a dehydrating condensation reaction. Specifically, the second aromatic monovinyl compound is exemplified by hydroxystyrene monomers such as hydroxystyrene or substitution derivatives thereof; hydroxyalkylstyrene monomers such as hydroxymethylstyrene or substitution derivatives thereof; acyloxystyrenes such as acetoxystyrene, ethanoyloxystyrene, and benzoyloxystyrene, wherein the acyloxy group has been converted to a hydroxyl group by hydrolysis; aminostyrene monomers such as aminostyrene or substitution derivatives thereof; aminoalkylstyrene monomers such as aminomethylstyrene or substitution derivatives thereof; and acylated monomers thereof and the like.

Examples of substitution derivatives of hydroxystyrene monomers and substitution derivatives of aminostyrene monomers include compounds resulting from substitution of one or more hydrogen atoms (excluding the hydrogen atoms contained in the hydroxyl group or amino group) contained in the monomer with an alkyl group having 1 to 5 carbon atoms, a halogen atom, a carboxyl group, a sulfonic acid group, a cyano group, a methoxy group, and/or a nitro group or the like. Although the hydroxyl group or amino group is preferably located at the para-position with respect to the vinyl group, the hydroxyl group or amino group may be present at the ortho-position or meta-position with respect to the vinyl group.

The second aromatic monovinyl compound is preferably unsubstituted p-hydroxystyrene, p-aminostyrene or p-acetoxystyrene.

As a typical structural unit from a second aromatic monovinyl compound monomer, the following structure unit (B) can be mentioned.

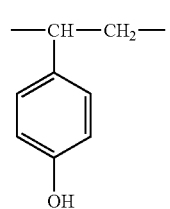

(B)

The content of the structural unit from a second aromatic monovinyl compound monomer in the copolymer constituting the porous resin beads of the present invention is generally 0.05 to 1 mmol/g, preferably 0.1 to 0.8 mmol/g, and more preferably 0.2 to 0.7 mmol/g. If the second aromatic monovinyl compound is too low, the desired effect of avoiding a reduction in the amount of nucleic acid synthesized and a reduction in synthesis purity is not obtained; if the second aromatic monovinyl compound is in excess, porous resin beads tend to be difficult to form.

The content of a functional group capable of binding to a carboxyl group by a dehydrating condensation reaction in the copolymer constituting the porous resin beads of the present invention is preferably 0.05 to 1 mmol/g, more preferably 0.1 to 0.8 mmol/g, and still more preferably 0.2 to 0.7 mmol/g. If the functional group content is too low, the amount of nucleic acid synthesized tends to decrease; if the functional group content is too high, the purity of nucleic acid tends to fall.

When the functional group capable of binding to a carboxyl group by a dehydrating condensation reaction is an amino group or a hydroxyl group, content of the amino group or hydroxyl group in the porous resin beads of the present invention is measured by a titration in compliance with the JIS K0070. Specifically, the measurement target hydroxyl group in a support for solid phase synthesis is acetylated with a predetermined amount of an acetylation reagent (acetic anhydride and pyridine), the amount of acetic anhydride that has not been consumed during the acetylation is determined by titration with potassium hydroxide, and the amino group content or hydroxyl group content is calculated. The specific procedures are shown below.

Pyridine is added to 25 g of acetic anhydride to make a total volume of 100 ml to obtain an acetylation reagent. A sample (dry porous resin beads), 0.5 to 2 g, is weighed out in a flask, and 0.5 ml of the above-mentioned acetylation reagent and 4.5 ml of pyridine are added accurately. After being kept at 95 to 100° C. for 2 hr, the mixture in the flask is allowed to cool to room temperature, after which 1 ml of distilled water was added. The flask was heated for 10 min. to decompose the acetic anhydride that has not been consumed in the acetylation. All content in the flask is transferred to a beaker, and diluted with distilled water to make a total volume of 150 ml, after which the dilution is titrated with a 0.5 mol/l aqueous potassium hydroxide solution.

Separately, a blank measurement is performed in the same way, but without adding the sample.

The hydroxyl group content of the sample is calculated by the formula (1) below:

$$A = (B-C) \times 0.5 \,(\text{mol/l}) \times f \times 1000 \div M \tag{1}$$

where A (μmol/g) is the hydroxyl group content of the sample;
B (ml) is the amount of aqueous potassium hydroxide solution added to neutralize the blank solution;
C (ml) is the amount of aqueous potassium hydroxide solution added to neutralize the sample;
f is a factor for the aqueous potassium hydroxide solution;
M (g) is the weight of the sample weighed out.

"Beads" in the porous resin beads of the present invention does not mean being exactly spherical, but means having any constant form (e.g., roughly spherical forms such as ellipse spherical, polygonal form, cylindrical form, irregular forms such as konpeito form, and the like). It is preferable that the shape of the porous resin beads be roughly spherical (most preferably spherical) because this allows an increase in the efficiency of filling in the synthesis reaction vessel when the beads are used as a support for synthesis, and also because this is unlikely to break the reaction vessel. The median particle diameter of the porous resin beads of the present invention is not particularly limited, and the diameter is preferably 1 to 1000 μm, more preferably 10 to 500 μm, and still more preferably 20 to 300 μm.

The median particle diameter of the porous resin beads of the present invention is determined by laser diffraction scattering. Specifically, the beads are dispersed by sonication for 10 min. with 50 v/v % ethanol aqueous solution as a dispersing medium, the resulting dispersion is analyzed using the laser diffraction scattering particle size distribution analyzer LA-920 (Horiba, Ltd.), and the median particle diameter is calculated.

The pore size, the number of pores and the like for the porous resin beads of the present invention are not particularly limited. The pore size can be quantified by median pore diameter. The median pore diameter of the porous resin beads of the present invention is not particularly limited, and the size is preferably 1 to 1000 nm, more preferably 5 to 500 nm, and still more preferably 10 to 200 nm. If the median pore diameter of the porous resin beads is too small, it is feared that the field of reaction decreases to an extent making the desired reaction unlikely to occur, and that the base sequence number in nucleic acid synthesis tends to be smaller than the desired number, when the porous resin beads of the present invention are used as a support for a chemical reaction. In contrast, if the median pore diameter of the porous resin beads is too large, the contact chance between the hydroxyl group on the beads surface, which serves as the field of the above-mentioned reaction, and the substance involved in the reaction, lowers, which is potentially disadvantageous for a support.

The median pore diameter of the porous resin beads is determined by mercury porosimetry. Specifically, an about 0.2 g sample is placed in the mercury porosimeter PoreMaster 60-GT (QuantaChrome Co.), and measurements are performed by the mercury injecting pressurization method under the condition of a mercury contact angle of 140° and a mercury surface tension of 480 dyn/cm.

The choice of method of producing the porous resin beads of the present invention is not particularly limited. Described below is a method of production thereof which comprises suspension-copolymerizing individual monomers, and hydrolyzing the resulting copolymer. In this method of production, first, a first aromatic monovinyl compound monomer, a divinyl compound monomer, and a (meth)acrylamide derivative monomer (and, as necessary, a second aromatic monovinyl compound monomer having a protected functional group capable of binding to a carboxyl group by a dehydrating condensation reaction) are subjected to suspension-copolymerization using an organic solvent and water to yield an aromatic monovinyl compound-divinyl compound-(meth)acrylamide derivative copolymer. Subsequently, this copolymer is hydrolyzed, and deprotection of the contained second aromatic monovinyl compound having a functional group capable of binding to the carboxyl group by the dehydrating condensation reaction is performed as required, whereby porous resin beads are obtained.

As the first aromatic monovinyl compound monomer, divinyl compound monomer, (meth)acrylamide derivative monomer, and second aromatic monovinyl compound monomer used in the above-mentioned suspension copolymerization, the compounds mentioned above to exemplify the structural units of the respective copolymers constituting the porous resin beads of the present invention can be mentioned.

The functional group capable of binding to a carboxyl group, contained in the second aromatic monovinyl compound monomer, by a dehydrating condensation reaction is preferably protected. An appropriate kind of protecting group is chosen according to the kind of functional group. For example, when the functional group is a hydroxyl group, an acyloxy group is preferably used as a protecting group. An acyloxy group is a group represented by the formula X—CO—O— (wherein X is an alkyl group); an acyloxy group wherein the alkyl group moiety represented by X has 1 to 5 carbon atoms is preferable, with preference given to an acetoxy group. Preferable specific examples of the second aromatic monovinyl compound monomer used in the above-mentioned suspension copolymerization include p-acetoxystyrene, p-benzoxystyrene and the like.

It is also possible to produce a support for solid phase synthesis of the porous resin beads according to the present invention, without protecting the second aromatic monovinyl compound. However, because an unprotected second aromatic monovinyl compound having a functional group capable of binding to a carboxyl group by a dehydrating condensation reaction (e.g., hydroxystyrene etc.) is an unstable monomer, handling and storage are not easy.

For this reason, preference is given to a method as described above, wherein a second aromatic monovinyl compound having a protected functional group capable of binding to a carboxyl group by a dehydrating condensation reaction is subjected to suspension-copolymerization, and the thus-obtained copolymer is hydrolyzed.

In the suspension copolymerization, the amount of first aromatic monovinyl compound monomer charged, relative to the total amount of first aromatic monovinyl compound monomer, divinyl compound monomer and (meth)acrylamide derivative monomer (and second aromatic monovinyl compound monomer used as necessary), is generally 1 to 9.5 mmol/g, preferably 2 to 9 mmol/g, more preferably 3 to 8 mmol/g, and still more preferably 4 to 7 mmol/g.

In the suspension copolymerization, the amount of divinyl compound monomer charged, relative to the total amount of first aromatic monovinyl compound monomer, divinyl compound monomer and (meth)acrylamide derivative monomer (and second aromatic monovinyl compound monomer used as necessary), is generally 0.1 to 2 mmol/g, preferably 0.2 to 1 mmol/g, and more preferably 0.3 to 0.8 mmol/g.

In the suspension copolymerization, the amount of (meth)acrylamide derivative monomer charged, relative to the total amount of first aromatic monovinyl compound monomer, divinyl compound monomer and (meth)acrylamide derivative monomer (and second aromatic monovinyl compound monomer used as necessary), is generally 0.3 to 4 mmol/g, preferably 0.4 to 3.5 mmol/g, and more preferably 0.6 to 3 mmol/g.

When a second aromatic monovinyl compound monomer is used, in the suspension copolymerization, the amount of second aromatic monovinyl compound monomer charged, relative to the total amount of first aromatic monovinyl compound monomer, divinyl compound monomer, (meth)acrylamide derivative monomer and second aromatic monovinyl compound monomer, is generally 0.05 to 1 mmol/g, preferably 0.1 to 0.8 mmol/g, and more preferably 0.2 to 0.7 mmol/g.

The above-mentioned suspension copolymerization is performed by stirring and emulsifying a mixture of the aforementioned monomers and an organic solvent in water. As used herein, the term "organic solvent" refers to a solvent, other than water, in a suspension copolymerization system. In the present invention, the above-mentioned organic solvent includes hydrocarbons and alcohols. Useful hydrocarbons include aliphatic saturated or unsaturated hydrocarbons and aromatic hydrocarbons, with preference given to aliphatic hydrocarbons having 5 to 12 carbon atoms, more preferably to n-hexane, n-heptane, n-octane, isooctane, undecane, dodecane and the like. The presence of an alcohol during suspension copolymerization makes the obtained beads porous. Examples of the alcohols include aliphatic alcohols, the number of carbon atoms in the alkyl group thereof being preferably 5 to 12; more preferable alcohols include 2-ethylhexylalcohol, tert-amyl alcohol, nonyl alcohol, 2-octanol, decanol, lauryl alcohol, cyclohexanol and the like.

The weight ratio of the above-mentioned hydrocarbon and alcohol is appropriately variable depending on the choice of hydrocarbon and alcohol used. According to the weight ratio, the specific surface area of the obtained porous resin beads is variable.

In the suspension copolymerization, the weight of organic solvent is preferably 0.5 to 2.5 times, more preferably 0.8 to 2.0 times relative to the total weight of monomers. If this value is too large or too small, the specific surface area of the obtained porous resin beads decreases, which in turn results in a decreased amount of chemically synthesized reaction product.

In the present invention, suspension copolymerization may be performed by a method known per se. Specifically, in suspension copolymerization, known dispersion stabilizers and peroxides such as benzoyl peroxide (polymerization initiators) can be used.

Other examples of the above-mentioned dispersion stabilizer include, but are not limited to, hydrophilic protecting colloid agents such as polyvinyl alcohol, polyacrylic acid, gelatin, starch, and carboxylmethylcellulose; or insoluble powders such as calcium carbonate, magnesium carbonate, calcium phosphate, barium sulfate, calcium sulfate, and bentonite, and the like.

The amount of the dispersion stabilizer added is not particularly limited, and the amount is preferably 0.01 to 10% by weight relative to the weight of the water in the suspension polymerization system. If this value is too small, the dispersion stability in suspension polymerization may decrease, which may lead to the production of a large amount of aggregate. If this value is too large, it may lead to the production of a large number of microbeads.

Examples of the above-mentioned polymerization initiator include, but are not limited to, initiators known to those of ordinary skill in the art, including peroxides such as dibenzoyl peroxide, dilauroyl peroxide, distearoyl peroxide, 1,1-di(tert-butylperoxy)-2-methylcyclohexane, 1,1-di(tert-hexylperoxy)-3,3,5-trimethylcyclohexane, 1,1-di(tert-hexylperoxy)cyclohexane, 1,1-di(tert-butylperoxy)cyclohexane, di-tert-hexyl peroxide, tert-butylcumyl peroxide, di-tert-butyl peroxide, 1,1,3,3-tetramethylbutylperoxy-2-ethylhexanoate, tert-hexylperoxy-2-ethylhexanoate, tert-butylperoxy-2-ethylhexanoate, and tert-butyl peroxyisopropylmonocarbonate; and azo compounds such as 2,2'-azobisisobutyronitrile, 2,2'-azobis-2-methylbutyronitrile, and 2,2'-azobis-2,4-dimethylvaleronitrile.

Reaction conditions for the suspension copolymerization can be set as appropriate; for example, stirring at 60 to 90° C. for 30 min. to 48 hr can be mentioned.

By a suspension copolymerization reaction as described above, an aromatic monovinyl compound-divinyl compound-(meth)acrylamide derivative copolymer can be obtained. After the obtained copolymer is appropriately washed, classified and the like, it is subjected to the hydrolysis treatment described below.

The hydrolysis performed to deprotect the protected group in the copolymer can be achieved using procedures and conditions known to those of ordinary skill in the art. For example, an acyloxy group can be converted to a hydroxyl group by hydrolysis using an acid catalyst or an alkali catalyst. Note that not all protecting groups must be removed in the hydrolysis treatment.

Through the treatments described above, the porous resin beads according to the present invention can be obtained. In this process, further treatments such as drying and classification may be performed as appropriate.

The porous resin beads according to the present invention can be used as a support for various chemical synthesis reactions, and can be used particularly effectively in nucleic acid synthesis.

The term nucleic acid as used herein refers to a linear compound (oligonucleotide) wherein nucleotides are connected via phosphodiester bonds, and is understood to encompass DNA, RNA and the like. The nucleic acid may be single-stranded or double-stranded. Because it allows the efficient synthesis using a nucleic acid synthesizer, the nucleic acid is preferably single-stranded.

The porous resin beads according to the present invention serve well as a solid phase support for the synthesis of nucleic acids, particularly of RNAs. Use of the porous resin beads according to the present invention as a solid phase support enables the synthesis of desired RNA at extremely high yields and purity. Although it remains unknown exactly why the porous resin beads according to the present invention are suitable for RNA synthesis, the hydrophilicity of (meth)acrylamide derivatives may be associated.

The nucleotide length of the nucleic acid is not particularly limited, and the nucleic acid is preferably 2 to 200 nucleotides long. If the nucleic acid is too long, the yield and purity of the nucleic acid obtained decrease.

As used herein, a nucleic acid synthesis reaction particularly means a nucleic acid elongation reaction. Specifically, a nucleotide is bound to a nucleoside, nucleotide or polynucleotide, each of which is bound to, via a cleavable linker, the porous resin beads of the present invention, whereby an elongated polynucleotide is obtained.

A linker refers to a molecule that joins two molecules via a covalent bond. Useful linkers include those known per se in use to join a support and a nucleic acid in solid phase nucleic acid synthesis. Preferable linkers include a nucleoside-succinyl linkers represented by the formula below:

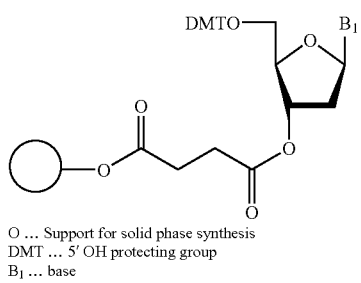

O ... Support for solid phase synthesis
DMT ... 5' OH protecting group
B$_1$ ... base Nucleic acid synthesis using the porous resin beads of the present invention as a solid phase support can be performed by a method known to those of ordinary skill in the art. A nucleic acid synthesis reaction can be performed by the H-phosphonate method, phosphoester method, solid phase phosphoramidite method and the like. In particular, the solid phase phosphoramidite method is preferable because of high capacity of synthesizing nucleic acid and high purity of nucleic acid obtained. This is described in U.S. Pat. No. 4,458,066 titled "PROCESS FOR PREPARING POLYNUCLEOTIDES" issued to Caruthers et al. For example, a synthesis cycle comprising the following four steps for binding a nucleotide is performed on the porous resin beads of the present invention:

(1) detritylation with dichloroacetic acid and the like to remove DMT being the protecting group for the 5'-OH of the nucleoside succinyl linker bound to the beads;
(2) coupling to bind a nucleoside phosphoramidite activated by tetrazole and the like to the aforementioned 5'-OH;
(3) capping to protect the 5'-OH to which the amidite has not bound, with acetic anhydride and the like; and
(4) oxidization with iodine and the like to have a phosphoric acid triester.

Nucleic acid production can be automated by connecting a reaction vessel (column etc.) filled with the porous resin beads of the present invention to an automated nucleic acid synthesizer incorporating a program for the steps of nucleic acid synthesis reaction. For example, as directed by the controller of the synthesizer or a computer, the individual steps are taken by a reagent distribution system that distributes the reagents to a reaction vessel filled with the porous resin beads of the present invention in a predetermined order, with the above-mentioned (1) to (4) being in 1 cycle. After this cycle is repeated as many times as required to produce the desired product, the beads bound with the synthesized nucleic acid (oligonucleotide) are taken out from the reaction vessel, and recovered in a vial. Concentrate ammonia and the like are added thereto, and the vessel is allowed to stand at 55° C. for 8 hr, whereby the succinyl linker is cleaved. The oligonucleotide is cut out from the beads; the cyanoethyl group is removed to obtain the form of phosphodiester; the amino-protecting group in the base moiety is removed; the steps of cutting out and deprotection are performed. Then, the oligonucleotide is isolated using a filter, whereby the desired nucleic acid is obtained.

EXAMPLES

The present invention is hereinafter described in more specifically with reference to the following Examples and Comparative Example, which examples, however, are not to limit the invention.

Example 1

(Suspension Copolymerization)
A 500-mL separable flask was attached to a constant-temperature water chamber equipped with a cooler, stirrer and nitrogen inlet tube; 2.5 g of polyvinyl alcohol (Kuraray) and 250 g of distilled water was placed therein, and this was followed by stirring at 300 rpm. While the chamber temperature was kept at 55° C. by supplying cooling water and gaseous nitrogen, the stirring was continued to dissolve the polyvinyl alcohol (solution A). Separately, 37 g of styrene (Wako Pure Chemical Industries), 4 g (0.41 mmol/g) of p-acetoxystyrene (Aldrich), 7 g (0.49 mmol/g) of divinylbenzene (content 55%, Wako Pure Chemical Industries), 12 g (1.18 mmol/g) of diacetoneacrylamide (Wako Pure Chemical Industries), 55 g of 2-ethylhexanol (Wako Pure Chemical Industries), 25 g of isooctane (Wako Pure Chemical Industries), and 1 g of benzoyl peroxide (NOF Corporation, 25% water contained) were mixed and dissolved (solution B). The solution B obtained was placed in the separable flask containing the solution A, and the mixture was stirred in a nitrogen atmosphere at room temperature and a peripheral speed of 2.0 m/s, after which the temperature was raised to 80° C., and suspension copolymerization was performed for 24 hr.
(Washing)
The resulting polymerization product was filtered and washed using distilled water and acetone (Wako Pure Chemical Industries), and dispersed in acetone to make a total volume of about 2 L. The polymerization product was dispersed using an ultrasonic homogenizer, after which the dispersion was filtered and washed using distilled water and acetone, and the product was dispersed in acetone to make a total volume of about 1 L.

(Size Classification)

This liquid dispersion was allowed to stand to precipitate a bead-form copolymer and kept standing until the precipitate became no longer turbulent even when the liquid was inclined, after which the supernatant acetone was discarded. Acetone was added to this precipitate to make a total volume of about 1 L, and the mixture was allowed to stand, after which the supernatant acetone was discarded. This operation was repeated in 12 cycles to achieve particle size classification. This liquid dispersion was filtered, and the residue was dried under reduced pressure to yield a powder of p-acetoxystyrene-styrene-divinylbenzene-diacetoneacrylamide copolymer beads.

(Hydrolysis)

A 500-mL separable flask was attached to a constant-temperature water chamber equipped with a cooler, stirrer and nitrogen inlet tube; 20 g of the powder of p-acetoxystyrene-styrene-divinylbenzene-diacetoneacrylamide copolymer beads and 100 g of ethanol were placed in the flask, and this was followed by stirring to disperse the beads. Subsequently, 1 g of sodium hydroxide was dissolved in 50 g of distilled water, and the resulting aqueous solution was added to the dispersion, after which the temperature was raised to 75° C., and hydrolysis was performed for 6 hr. After completion of the reaction, the reaction mixture obtained was neutralized with hydrochloric acid, and then filtered and washed using distilled water and acetone. This liquid dispersion was filtered, and the residue was dried under reduced pressure to yield a support for solid phase synthesis of porous resin beads consisting of the p-hydroxystyrene-styrene-divinylbenzene-diacetoneacrylamide copolymer.

Example 2

The same procedure as Example 1 was followed, except that 40 g of styrene (Wako Pure Chemical Industries), 4 g (0.41 mmol/g) of p-acetoxystyrene (Aldrich), 7 g (0.49 mmol/g) of divinylbenzene (content 55%, Wako Pure Chemical Industries), and 9 g (1.51 mmol/g) of N,N-dimethylacrylamide (Wako Pure Chemical Industries) were used as monomers, and that 65 g of 2-ethylhexanol (Wako Pure Chemical Industries) and 25 g of isooctane (Wako Pure Chemical Industries) were used as organic solvents, whereby a support for solid phase synthesis of porous resin beads consisting of a p-hydroxystyrene-styrene-divinylbenzene-N,N-dimethylacrylamide copolymer was obtained.

Example 3

The same procedure as Example 1 was followed, except that 31 g of styrene (Wako Pure Chemical Industries), 4 g (0.41 mmol/g) of p-acetoxystyrene (Aldrich), 7 g (0.49 mmol/g) of divinylbenzene (content 55%, Wako Pure Chemical Industries), and 18 g (2.65 mmol/g) of N-isopropylacrylamide (Wako Pure Chemical Industries) were used as monomers, and that 78 g of 1-decanol (Wako Pure Chemical Industries) was used as an organic solvent, whereby a support for solid phase synthesis of porous resin beads consisting of a p-hydroxystyrene-styrene-divinylbenzene-N-isopropylacrylamide copolymer was obtained.

Example 4

The same procedure as Example 1 was followed, except that 37 g of styrene (Wako Pure Chemical Industries), 4 g (0.41 mmol/g) of p-acetoxystyrene (Aldrich), 7 g (0.49 mmol/g) of divinylbenzene (content 55%, Wako Pure Chemical Industries), and 12 g (1.55 mmol/g) of N-methoxymethylmethacrylamide (Wako Chemical) were used as monomers, and that 55 g of 2-ethylhexanol (Wako Pure Chemical Industries) and 25 g of isooctane (Wako Pure Chemical Industries) were used as organic solvents, whereby a support for solid phase synthesis of porous resin beads consisting of a p-hydroxystyrene-styrene-divinylbenzene-N-methoxymethylmethacrylamide copolymer was obtained.

Example 5

The same procedure as Example 1 was followed, except that 25 g of styrene (Wako Pure Chemical Industries), 4 g (0.41 mmol/g) of p-acetoxystyrene (Aldrich), 7 g (0.49 mmol/g) of divinylbenzene (content 55%, Wako Pure Chemical Industries), 12 g (1.77 mmol/g) of N-isopropylacrylamide (Wako Pure Chemical Industries), and 12 g of methacrylonitrile (Wako Pure Chemical Industries) were used as monomers, and that 72 g of 1-decanol (Wako Pure Chemical Industries) was used, whereby a support for solid phase synthesis of porous resin beads consisting of a p-hydroxystyrene-styrene-divinylbenzene-N-isopropylacrylamide-methacrylonitrile copolymer was obtained.

Example 6

The same procedure as Example 1 was followed, except that 40 g of styrene (Wako Pure Chemical Industries), 6 g (0.62 mmol/g) of p-acetoxystyrene (Aldrich), 9 g (0.52 mmol/g) of dimethacrylic acid triethylene glycol (Shin-Nakamura Chemical Co., Ltd., trade name NK Ester 3G), and 5 g (0.84 mmol/g) of N,N-dimethylacrylamide (Wako Pure Chemical Industries) were used as monomers, and that 84 g of 1-decanol (Wako Pure Chemical Industries) was used as an organic solvent, whereby a support for solid phase synthesis for porous resin beads consisting of a p-hydroxystyrene-styrene-dimethacrylic acid triethylene glycol-N,N-dimethylacrylamide copolymer was obtained.

Comparative Example 1

The same procedure as Example 1 was followed, except that 49 g of styrene (Wako Pure Chemical Industries), 4 g (0.41 mmol/g) of p-acetoxystyrene (Aldrich), and 7 g (0.49 mmol/g) of divinylbenzene (content 55%, Wako Pure Chemical Industries) were used as monomers, and that 52 g of 2-ethylhexanol (Wako Pure Chemical Industries) and 23 g of isooctane (Wako Pure Chemical Industries) were used, whereby a support for solid phase synthesis for porous resin beads consisting of a p-hydroxystyrene-styrene-divinylbenzene copolymer was obtained.

Experimental Example (Determination of Properties of Supports for Solid Phase Synthesis)

The supports for solid phase synthesis of porous resin beads obtained in Examples 1 to 6 and Comparative Example 1 were analyzed to determine their properties shown below.

(1) Median Particle Diameter

Each sample was dispersed by sonication in 50 v/v % ethanol solution. This liquid dispersion was analyzed using the laser diffraction/scattering particle size distribution apparatus LA-920 (Horiba, Ltd.) with 50 v/v % ethanol solution as a dispersing medium.

(2) Median Pore Diameter

A 0.2 g sample was placed in the mercury porosimeter PoreMaster 60-GT (QuantaChrome Co.), and analyzed by mercury intrusion method under the condition of a mercury contact angle of 140° and a mercury surface tension of 480 dyn/cm.

(3) Hydroxyl Group Content

A 0.5-2 g sample was weighed out in a flask, and 0.5 mL of an acetylation reagent (25 g of acetic anhydride and pyridine added to make a total volume of 100 mL) and 4.5 mL of pyridine were accurately added. After being kept at 95 to 100° C. for 2 hr, the mixture in the flask was allowed to cool to room temperature, after which 1 ml of distilled water was added. Subsequently, the mixture was heated for 10 minutes to decompose the acetic anhydride that had not been consumed during the acetylation; the total amount in the flask was transferred to a beaker and diluted with distilled water to make a total volume of 150 mL, after which the mixture was titrated with 0.5 N aqueous potassium hydroxide solution. Separately, titration was performed in the same way, but without adding the sample (blank determination). The hydroxyl group content (mmol/g) of the sample was calculated using the formula (1):

$$A(\text{mmol/g}) = (B-C) \times 0.5 \,(\text{mol/L}) \times f \div M \qquad (1)$$

where A (mmol/g) is the hydroxyl group content of the sample;
B (mL) is the amount of aqueous potassium hydroxide solution added to neutralize the blank solution;
C (mL) is the amount of aqueous potassium hydroxide solution added to neutralize the sample;
f is a factor for the aqueous potassium hydroxide solution;
M (g) is the weight of the sample weighed out.

(4) Acrylamide Derivative Structural Unit Content

A 2 to 3 mg sample was placed in a platinum pan and accurately weighed on a microbalance. This sample was analyzed using the total nitrogen analyzer TN-110 (Mitsubishi Chemical) to determine the acrylamide derivative structural unit content. Calculated from the N concentration (% by weight) obtained was the content (mmol/g) of acrylamide derivative structural unit D using the formula (2):

$$D \text{ content (mmol/g)} = (N \text{ concentration (\% by weight)} \times 10)/(N \text{ molecular weight} \times N \text{ number in } D) \qquad (2)$$

(RNA Synthesis and Evaluation)

Using the supports for solid phase synthesis of porous resin beads obtained in Examples 1 to 6 and Comparative Example 1, RNAs were synthesized and evaluated as described below.

One gram of each support for solid phase synthesis, 0.095 g of DMT-dT-3'-succinate (Beijing OM Chemicals), 0.045 g of HBTU (Novabiochem), 0.038 ml of N,N-diisopropylethylamine (Aldrich), and 10 ml of acetonitrile (Wako Pure Chemical Industries) were mixed, and this mixture was stirred at room temperature for 12 hr to cause the reaction. The reaction product was filtered and washed with acetonitrile, after which the support was dried. This was admixed with 2.5 ml of CapA (20% acetic anhydride/80% acetonitrile), 2.5 ml of CapB (20% N-methylimidazole/30% pyridine/50% acetonitrile), 0.025 g of 4-dimethylaminopyridine (Aldrich), and 5 ml of acetonitrile (Wako Pure Chemical Industries), and the mixture was reacted at room temperature with stirring for 12 hr. The reaction product was filtered and washed with acetonitrile, after which the support was dried under reduced pressure to yield a support for solid phase synthesis with DMT-dT-3'-succinate bound thereto. The amount of DMT-dT-3'-succinate bound was calculated via absorptiometry (412 nm) for DMT groups deprotected using p-toluenesulfonic acid/acetonitrile solution.

The thus-obtained support for solid phase synthesis with DMT-dT-3'-succinate bound thereto, 10 mg, was placed in a synthesis column, and applied to the Applied Biosystems 3400 DNA synthesizer (Applied Biosystems), whereby a nucleic acid (dT×1 mer+mixed sequence of rA, rG, rC, and rU×21 mer) was synthesized under the conditions of 1 μmol synthesis scale and DMT-off. After completion of the synthesis, the column was dried; thereafter the nucleic acid was cut out from the support for solid phase synthesis, the base amino groups were deprotected, and the support for solid phase synthesis was separated by filtration. The resulting filtrate was subjected to UV absorptiometry (260 nm), and the OD yield of nucleic acid (equivalent to the amount of nucleic acid synthesized) was determined. Next, the filtrate was dried, the 2' hydroxyl groups of the resulting RNAs were deprotected, and full-length % (ratio of RNAs with desired sequence length) was calculated by HPLC (Waters). The results are shown in Table 1.

TABLE 1

| Analytical parameter | Unit of measurement | Example 1 | Example 2 | Example 3 | Example 4 | Example 5 | Example 6 | Comparative Example 1 |
|---|---|---|---|---|---|---|---|---|
| Median particle diameter | μm | 64 | 66 | 52 | 68 | 52 | 74 | 90 |
| Median pore diameter | nm | 24 | 25 | 20 | 54 | 65 | 83 | 53 |
| Hydroxyl group content | mmol/g | 0.48 | 0.53 | 0.48 | 0.49 | 0.49 | 0.68 | 0.42 |
| Acrylamide derivative content | mmol/g | 0.64 | 0.72 | 1.13 | 0.60 | — | 0.35 | 0 |
| Amount of DMT-dT-3'-succinate bound | mmol/g | 98 | 100 | 96 | 98 | 105 | 98 | 100 |
| OD yield | OD/μmol | 130 | 133 | 134 | 117 | 122 | 129 | 106 |
| Full-length | % | 56 | 60 | 64 | 56 | 58 | 57 | 51 |

As is evident from Table 1, all the supports for solid phase synthesis of porous resin beads according to the present invention exhibited higher values of OD yield (amount of RNA synthesized) and full-length % (synthesis purity) than those of the Comparative Example.

Industrial Applicability

The present invention provides porous resin beads that allow the synthesis of a large amount of nucleic acid, without reducing the synthesis purity thereof, when used as a support for solid phase synthesis in nucleic acid synthesis. Use of the porous resin beads of the present invention allows the avoidance of a reduction in the amount synthesized and a reduction in the synthesis purity, even for nucleic acids that are difficult to synthesize chemically, like RNAs.

Citation List

Patent Literature 1: JP-A-3-68593
Patent Literature 2: JP-A-2005-325272
Non-patent Literature 1: Current Protocols in Nucleic Acid Chemistry (2000)

The invention claimed is:

1. Porous resin beads comprising a first aromatic monovinyl compound-divinyl compound-(meth)acrylamide derivative copolymer that further comprises as a structural unit a second aromatic monovinyl compound having a functional group capable of binding to a carboxyl group by a dehydrating condensation reaction, wherein
the first aromatic monovinyl compound is styrene,
the second aromatic monovinyl compound having a functional group capable of binding to a carboxyl group is hydroxystyrene,
the divinyl compound is selected from divinylbenzene, monovalent ethylene glycol di(meth)acrylate, and polyvalent ethylene glycol di(meth)acrylate, and
the (meth)acrylamide derivative is selected from N-alkyl (meth)acrylamides, N,N-dialkyl(meth)acrylamides, N-alkoxyalkyl(meth)acrylamides, and diacetoneacrylamide.

2. The porous resin beads of claim 1, wherein the content of the (meth)acrylamide derivative unit in the copolymer is 0.3 to 4 mmol/g.

3. The porous resin beads of claim 1, wherein the content of the amino group or hydroxyl group in the copolymer is 0.05 to 1 mmol/g.

4. The porous resin beads of claim 1, wherein the (meth) acrylamide derivative is selected from N-alkyl (meth)acrylamides, N,N-dialkyl (meth)acrylamides, and diacetoneacrylamide.

5. The porous resin beads of claim 1, wherein the divinyl compound is divinylbenzene.

6. A method of producing a polynucleotide, which method comprises binding (a) a nucleotide to (b) a nucleoside, nucleotide or polynucleotide, each of which is bound to, via a cleavable linker, a porous resin bead of claim 1, to obtain an elongated polynucleotide.

7. A method of producing a polynucleotide, which method comprises binding (a) a nucleotide to (b) a nucleoside, nucleotide or polynucleotide, each of which is bound to, via a cleavable linker, a porous resin bead of claim 2, to obtain an elongated polynucleotide.

8. A method of producing a polynucleotide, which method comprises binding (a) a nucleotide to (b) a nucleoside, nucleotide or polynucleotide, each of which is bound to, via a cleavable linker, a porous resin bead of claim 3, to obtain an elongated polynucleotide.

9. A method of producing a polynucleotide, which method comprises binding (a) a nucleotide to (b) a nucleoside, nucleotide or polynucleotide, each of which is bound to, via a cleavable linker, a porous resin bead of claim 4, to obtain an elongated polynucleotide.

10. A method of producing a polynucleotide, which method comprises binding (a) a nucleotide to (b) a nucleoside, nucleotide or polynucleotide, each of which is bound to, via a cleavable linker, a porous resin bead of claim 5, to obtain an elongated polynucleotide.

11. The porous resin beads of claim 5, wherein the (meth) acrylamide derivative is selected from N-isopropylacrylamide, N, N-dimethylacrylamide, and N-methoxymethylmethacrylamide, and diacetoneacrylamide.

12. The porous resin beads of claim 1, wherein the divinyl compound is dimethacrylic acid triethylene glycol.

13. The porous resin beads of claim 12, wherein the (meth) acrylamide derivative is selected from N-isopropylacrylamide, N,N-dimethylacrylamide, and N-methoxymethylmethacrylamide, and diacetoneacrylamide.

14. The porous resin beads of claim 1, wherein the (meth) acrylamide derivative is selected from N-isopropylacrylamide, N,N-dimethylacrylamide, and N-methoxymethylmethacrylamide, and diacetoneacrylamide.

15. A method of producing a polynucleotide, which method comprises binding (a) a nucleotide to (b) a nucleoside, nucleotide or polynucleotide, each of which is bound to, via a cleavable linker, a porous resin bead of claim 11, to obtain an elongated polynucleotide.

16. A method of producing a polynucleotide, which method comprises binding (a) a nucleotide to (b) a nucleoside, nucleotide or polynucleotide, each of which is bound to, via a cleavable linker, a porous resin bead of claim 12, to obtain an elongated polynucleotide.

17. A method of producing a polynucleotide, which method comprises binding (a) a nucleotide to (b) a nucleoside, nucleotide or polynucleotide, each of which is bound to, via a cleavable linker, a porous resin bead of claim 13, to obtain an elongated polynucleotide.

18. A method of producing a polynucleotide, which method comprises binding (a) a nucleotide to (b) a nucleoside, nucleotide or polynucleotide, each of which is bound to, via a cleavable linker, a porous resin bead of claim 14, to obtain an elongated polynucleotide.

* * * * *